United States Patent [19]

Keller

[11] Patent Number: 5,507,113

[45] Date of Patent: Apr. 16, 1996

[54] BAIT CONTAINER SUPPORT AND OPENING CARRIAGE

[76] Inventor: Edward O. Keller, Rte. 1, Box 3, Tintah, Minn. 56583

[21] Appl. No.: 170,375

[22] Filed: Dec. 20, 1993

[51] Int. Cl.⁶ .................................................. A01K 97/00
[52] U.S. Cl. ........................ 43/55; 206/315.11; 248/139
[58] Field of Search .................................. 248/139, 286, 248/299; 220/481, 737; 206/315.11; 224/920; 43/54.1, 55, 56, 57.1

[56] References Cited

U.S. PATENT DOCUMENTS

| | | | |
|---|---|---|---|
| 1,529,265 | 3/1925 | Merckel | 248/299 |
| 2,485,075 | 10/1949 | Szenasi et al. | 248/139 |
| 2,485,684 | 10/1949 | Aldredge, Sr. | 43/55 |
| 2,487,645 | 11/1949 | Gershon | 43/56 |
| 2,560,054 | 7/1951 | Wells | 43/55 |
| 2,663,533 | 12/1953 | Keiser et al. | 248/284 |
| 2,721,718 | 10/1955 | Wagner | 43/55 |
| 2,729,016 | 1/1956 | McDaniel | 43/55 |
| 2,834,138 | 5/1958 | Pedersen | 43/55 |
| 2,855,720 | 10/1958 | Allen | 43/55 |
| 2,966,002 | 12/1960 | Hobson | 43/55 |
| 2,974,437 | 3/1961 | Stadler | 43/55 |
| 3,095,601 | 7/1963 | Wier | 43/55 |
| 3,220,140 | 11/1965 | Shirley, Sr. | 43/55 |
| 3,728,812 | 4/1973 | Woolworth et al. | 43/55 |
| 4,627,189 | 12/1986 | Pippin | 43/55 |
| 4,686,788 | 8/1987 | Hartman | 43/56 |

*Primary Examiner*—Richard K. Seidel
*Assistant Examiner*—James Miner
*Attorney, Agent, or Firm*—Moore & Hansen

[57] ABSTRACT

The present invention provides a carriage that slidingly supports a bait container between a pair of elongate sidewalls. The carriage embraces a slide frame and a mounting apparatus for mounting the slide frame to the side of a boat. The slide frame has a pair of elongate, spaced apart sidewalls that slidingly receive a bait container therebetween. The sidewalls are joined at the tops and bottoms thereof by respective top and bottom wall support rings. The top ring is attached to the mounting apparatus that is used to attach the present invention to the side of a boat. The mounting apparatus includes a rotation plate that is attached to the top ring and is selectively rotatable thereto so as to selectively position the sidewalls at a preferred angular position relative to the boat gunwale. The mounting apparatus further includes a shaft, which may be a carriage bolt, that extends outwardly from the plate so as to be pivotally received by a sleeve that is attached to a mounting mechanism configured to be mounted to the side of a boat. The shaft or bolt receives a guide washer and fastener to removably attach the shaft to the sleeve.

17 Claims, 4 Drawing Sheets

BAIT CONTAINER SUPPORT AND OPENING CARRIAGE

FIELD OF THE INVENTION

The present invention relates generally to containers for holding live bait used by fishermen and in particular to a support and opening carriage useful for such containers when used on a boat.

BACKGROUND OF THE PRESENT INVENTION

It has long been known to attach bait containers holding live bait such as minnows, leeches, etc. to the side of a boat while fishing. The containers are usually attached to the boat by means of a rope, chain, or cable attached at one end to the handle of the container and at the other end to some fixture, such as an oarlock, attached to the boat. Usually such containers include a number of holes sized to be small enough such that the bait cannot escape from the container. These holes allow water to flow through the container, thereby providing a fresh supply of oxygenated water to the bait at all times and preventing the bait from dying due to the water in the container from becoming stale.

There are many varieties of the aforementioned type of bait containers available. One such type includes inner and outer metal or plastic, nesting buckets. The inner bucket has a multiplicity of flow through holes and it rests within the outer bucket. The inner bucket contains a lid through which the bait inside can be reached by the fisherman. Typically the lid is spring biased to a closed position. The fisherman can remove the inner bucket from the outer bucket and place it in the water when fishing. The inner bucket of this type usually has the aforementioned multiplicity of holes disposed in the cylindrical side wall near the bottom. As such, it cannot normally retain enough water to keep the bait alive by itself. The outer bucket has no such holes and acts as a water retention device to keep the water in the inner bucket at a desired level so as to keep the bait alive when the bait container is removed from the water.

Another well known variety of the foregoing type of bait container is the "Flow Troll"® trolling bucket manufactured by Frabill, Inc. of Allenton, Wis. This container has a roughly cylindrical configuration with a pair of flotation lobes disposed on opposite sides thereof. The upper half of the container has a multiplicity of holes on the "rear" of the container while directly opposite thereto on the front of the container is a door spring biased to a closed position that has a multiplicity of holes. The container also includes a weight attached to the bottom interior adjacent the rear side. The weight and the flotation lobes cause the container to float on its back or rear side, thereby allowing the fisherman access to the interior of the container and to the bait held therein since the container will be floating with the door facing upward. This floating container, unlike the aforementioned inner bucket which sinks below the surface of the water, can become warm even in cooler water however, since it floats substantially out of the water and is exposed to the sun as a result. Since water enters the container only through the rear, submerged holes, if the circulation of the water within the bucket is not sufficiently great, the water held therein may heat up slightly inside the bucket to the detriment of the quality of the bait held therein.

Both of the aforementioned varieties of bait containers include a handle attached to the container in some manner. Typically, a rope or line is attached at one end to the handle and at the other end to the boat in some manner. The containers are lowered into the water while the boat is anchored, drifting, or slowly trolling. One of the deficiencies of the foregoing varieties is that when the fisherman decides to move to another fishing spot, the bait container may be initially forgotten about. Consequently, the fisherman may begin to move the boat at a high rate of speed to a new fishing location, only to look behind him to find that the bait container is bouncing off the waves to the extreme detriment of his bait. In addition, the operation of each of the foregoing types of bait containers requires the use of two hands. One hand must be used to hold the container and another to open the door into the container to reach the bait.

It would be desirable to have a bait container support for commercially available bait containers that was readily attachable to a boat and that would support the container below or substantially below water level to assure a fresh supply of cool, oxygenated water to the bait while being capable of automatically lifting the bait out of the water when the boat was moving at a high rate of speed. It would further be desirable to have a bait container support that would facilitate the fisherman in accessing the live bait within the bait container by making the step of accessing the bait within the container possible with one hand.

SUMMARY OF THE INVENTION

It is an object of the present invention to provide new and improved apparatus that is not subject to the foregoing disadvantages.

It is another object of the present invention to provide apparatus for supporting a bait container that will support the container at a desired position relative to the water surface.

It is yet another object of the present invention to provide apparatus for pivotally supporting a bait container relative to the boat and to the surface of a body of water.

It is still yet another object of the present invention to provide apparatus that will automatically pivot so as to ultimately support the bait container above the surface of the water as the boat increases its speed through the water.

The foregoing objects of the present invention are provided by a carriage that slidingly supports a bait container between a pair of elongate sidewalls. Such a carriage in accord with the present invention embraces a slide frame and a mounting apparatus for mounting the slide frame to the side of a boat. The slide frame has a pair of elongate, spaced apart sidewalls that slidingly receive a bait container therebetween. The sidewalls are joined at the tops and bottoms thereof by respective top and bottom wall support rings. The bottom ring member is preferably sized so as to prevent the bait container from sliding therethrough while the top ring is sized to allow the fisherman to insert the bait container into the slide frame between the sidewalls thereof. The top ring is attached to the mounting apparatus that is used to attach the present invention to the gunwale or side of a boat. The mounting apparatus includes a rotation plate that is attached to the top ring and is selectively rotatable thereto so as to selectively position the sidewalls at a preferred angular position relative to the boat gunwale. The mounting apparatus further includes a shaft, which may be a carriage bolt, that extends outwardly from the plate so as to be pivotally received by a sleeve that is attached to a mounting mechanism configured to be mounted to the side of a boat. The shaft or bolt receives a guide washer and fastener to removably attach the shaft to the sleeve. A further feature of the present invention is that it includes a positioner for placing the bait container in a bait accessible position. In the embodiment of the present invention shown herein the positioner may be an advantageously positioned bolt or other similar member that extends inwardly from one of the sidewalls and upon which the bait container may be rested when moved to the bait accessible position.

In a first embodiment, the mounting mechanism is a multiply-positionable and attachable device for accommodating different sizes and different designs of boat sidewalls. A mounting mechanism according to this embodiment entails a unitary dual right angle bracket having three walls, two of which are parallel to each other and perpendicular to the wall intermediate thereof. The first wall is disposed over the top of the boat gunwale and has a pair of elongate slots to variably receive a pair of bolts. The bolts are used to attach a right angle bracket thereto that extends over the boat sidewall in direct contact therewith and along the inner side of the boat sidewall. The dual right angle bracket further has a second wall that extends perpendicularly to the first wall and that extends downwardly along the side of the boat sidewall. The second wall is attached to the right angle bracket by means of a pair of bolts that allow the right angle bracket and the second sidewall to be snugly attached to the boat sidewall. That is, the second wall of the dual right angle bracket and the downwardly depending wall of the right angle bracket clamp the boat sidewall therebetween. The third wall of the dual right angle bracket extends away from the second sidewall substantially perpendicularly thereto and away from the boat sidewall when the present invention is mounted thereto. The third wall is attached by means of bolts to an attachment plate that extends underneath the boat sidewall and into engagement therewith so that the present invention may be snugly attached to the boat sidewall and not be easily pivotable with respect thereto. The attachment plate has a pair of slots that receive the bolts by which it is attached to the third wall so that it may be slidably positioned relative to the thickness of the boat sidewall and so that it may accommodate a variety of boats having varying sidewall thicknesses. The third wall is disposed relative to the second wall so as to engage the rotation plate and thereby limit the range of pivotal movement of the slide frame relative to the boat.

In a second embodiment the mounting mechanism has two right angle brackets fixedly mounted to each other to form a three wall structure. The first wall extends over the top of the boat sidewall, the second downwardly along the outside of the boat sidewall and the third away from the boat sidewall into selective engagement with the rotation plate to limit the pivotal movement of the slide frame relative to the boat. The first wall may include a plurality of through holes by which the first wall may be removably attached by means of bolts directly to the boat sidewall.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
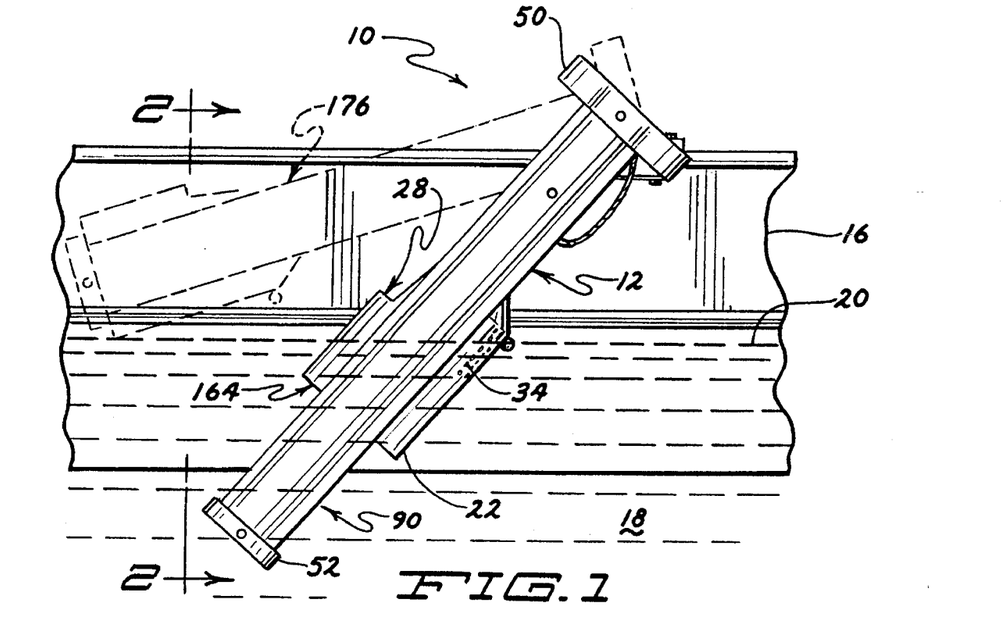
FIG. 1 illustrates a side elevation view of the present invention showing the present invention mounted to the starboard side of a boat in a drifting or trolling position and showing the present invention in phantom pivoted to a high boat speed position.
Figure 2:
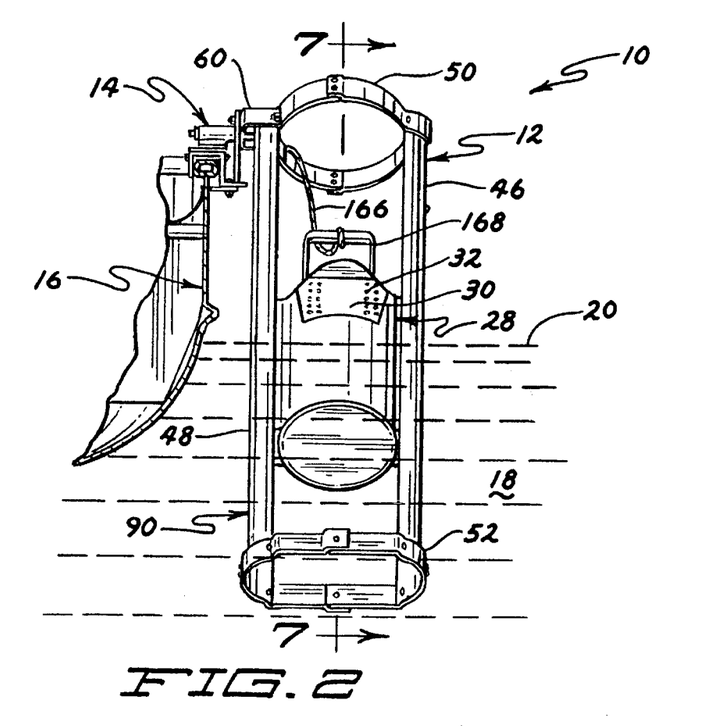
FIG. 2 shows the present invention in a stern to bow view taken along viewing plane 2—2 of FIG. 1.
Figure 3:
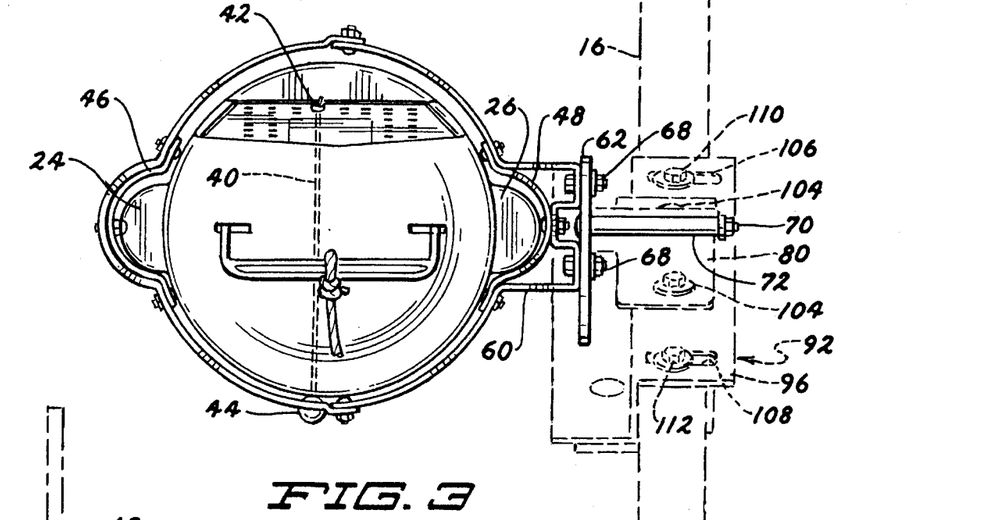
FIG. 3 illustrates the present invention in a top elevation view.
Figure 7:
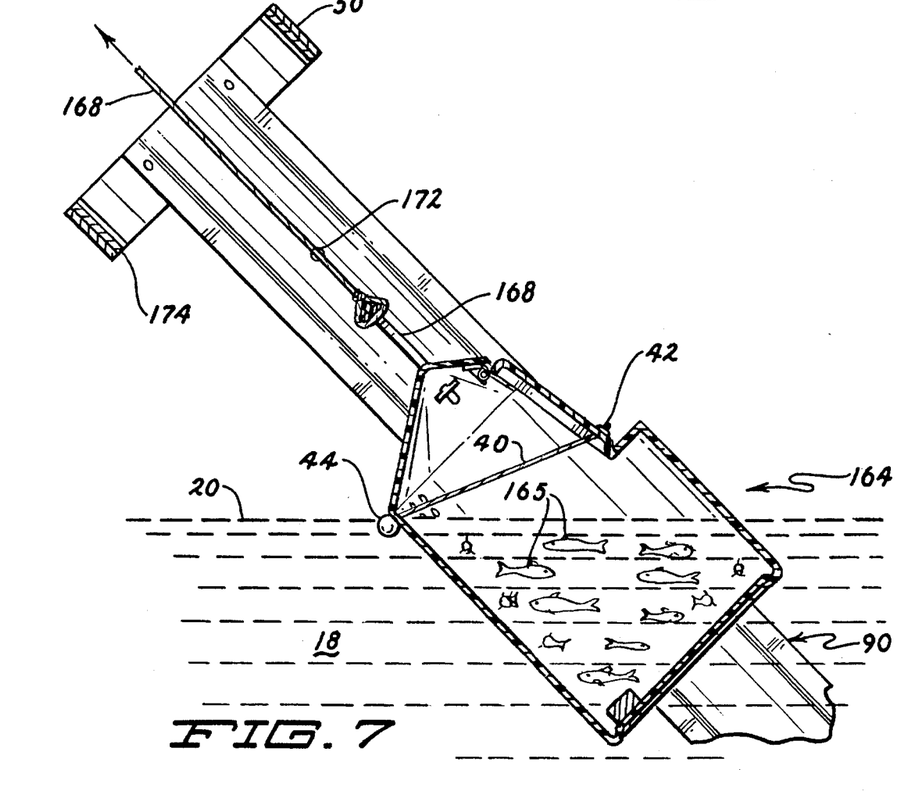
FIG. 7 illustrates the present invention is a partial side elevation, partial cross sectional view with the bait container shown in a cross sectional view in a drifting or trolling position.
Figure 8:
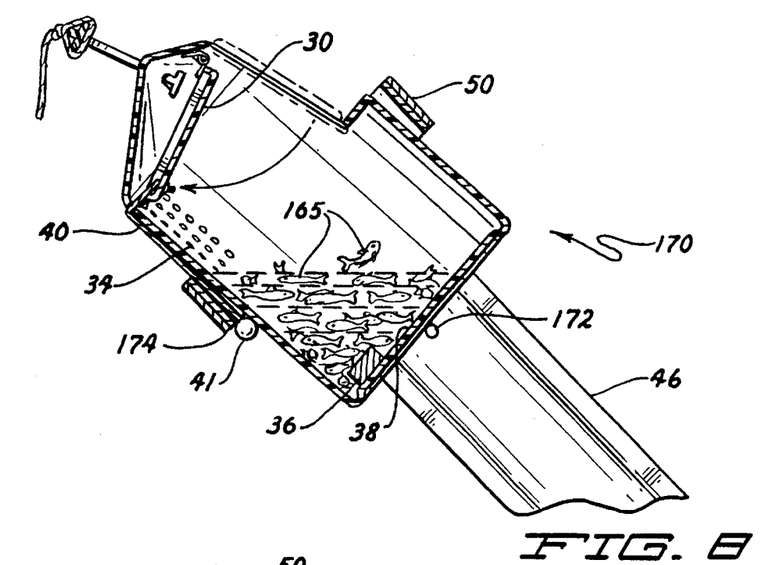
FIG. 8 is a partial side elevation view of the present invention with a bait container disposed in a bait accessing position and shown in a side elevation cross sectional view with the bait container door automatically swung to an open, bait accessible position by the operation of the present invention.

FIGS. 1 and 2 illustrate a bait container support and opening carriage 10 in accord with the present invention. The carriage 10 includes a slide frame 12 and a mounting apparatus 14 for mounting the slide frame 12 to the side of a boat 16. The boat 16 is shown relative to a body of water 18 having a surface 20. As shown in the Figures, a bait container 22 is slidingly supported and carried by the carriage 10. As best seen in FIG. 3, container 22 is of the aforementioned type of bait container known as the "Flow Troll"® trolling bucket manufactured by Frabill, Inc. of Allenton, Wis. Container 22 has a roughly cylindrical configuration with a pair of flotation lobes 24 and 26 (FIG. 3) disposed on opposite sides thereof. The container 22 has an upper portion 28 that has a door 30 spring biased to a closed position. The door 30 that has a multiplicity of holes 32 therein. The upper portion 28 includes a multiplicity of holes 34 on the "rear" of the container 22 directly opposite to door 30. As best seen in FIGS. 7 and 8, the container 22 also includes a weight 36 attached to the interior bottom 38 adjacent the rear side.

The container 22, and particularly the door 30, has been modified to take full advantage of the features of the present invention as will be now explained. Thus, as best seen in FIG. 3, container 22 now includes apparatus for opening door 30. The apparatus includes a cord 40 (shown in phantom) that extends between and through the one of the holes 32 and one of the holes 34 substantially directly opposite thereto. Cord 40 is fastened at one end to door 30, such as by tying a knot 42 therein and at the other end to the rear wall by a knob 44. Pulling on knob 44 causes door 30 to swing inward into the container 22 so that the bait may be accessed by the fisherman, as best seen in FIG. 8. The present invention is so constructed that the knob 44 will be automatically engaged and thus the door 30 will be opened at the desired times in the manner to be explained hence.

Referring again to FIGS. 1 and 2 in particular, slide frame 12 includes a pair of oppositely disposed sidewalls 46 and 48. Sidewalls 46 and 48 form a channel for the sliding movement of container 22 relative thereto. Sidewalls 46 and 48 function as means for constraining movement of the container 22 in directions other than along the elongate axis of the slide frame 12. The embodiment of slide frame 12 shown in the drawings is specifically configured to slidingly receive the Frabill type of container shown in that each sidewall 46 and 48 is specifically configured to slidingly receive one of the floatation lobes 24 and 26 respectively (FIG. 3). The present invention is not limited to the aforedescribed Frabill type of container, however, and sidewalls 46 and 48 may assume a variety of configurations conformable to the various bait containers available now or in the future.

Sidewalls 46 and 48 are supported in their spaced apart relationship by a top ring 50 and a bottom ring 52. Rings 50 and 52 may be attached to sidewalls 46 and 48 with nut/bolt types of fasteners, welded thereto, or attached in any other known manner. Rings 50 and 52 may be formed from a single piece of material or from two or more separate pieces of material that are then attached to each other to form the rings. As shown in FIG. 3, top ring 50 has a configuration that substantially matches the cross sectional shape of container 22. Top ring 50 should be of sufficient dimensions to allow container 22 to be inserted therein into slide frame 12. Bottom ring 52 is preferably of smaller size than the cross sectional area of the container 22 so as to prevent it from slipping out the bottom end of slide frame 12. As shown in the drawings, bottom ring 52 has a pair of substantially straight sides with a pair of ends having substantially the same shape as the floatation lobes 24 and 26. Again, the present invention is shown with respect to a particular type of bait container commercially available and currently popular with fishermen, though it will be understood that the present invention contemplates that the slide frame can be configured to accommodate a variety of commercially available bait containers.

Figure 4:
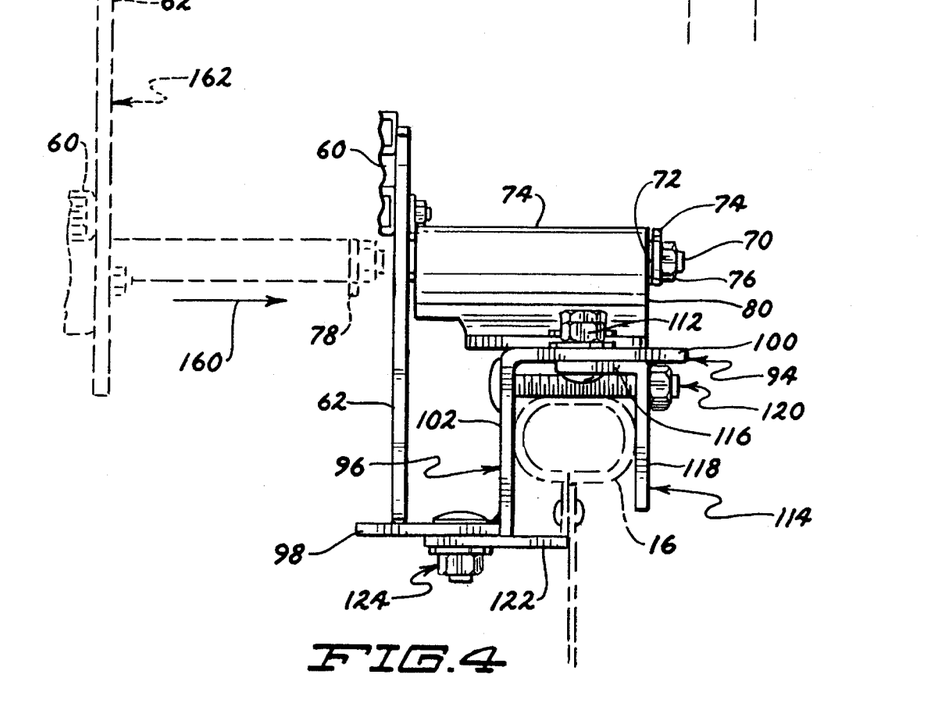
FIG. 4 depicts an embodiment of a mounting apparatus for attachment of the present invention to the side of a boat which is shown in phantom.
Figure 5:
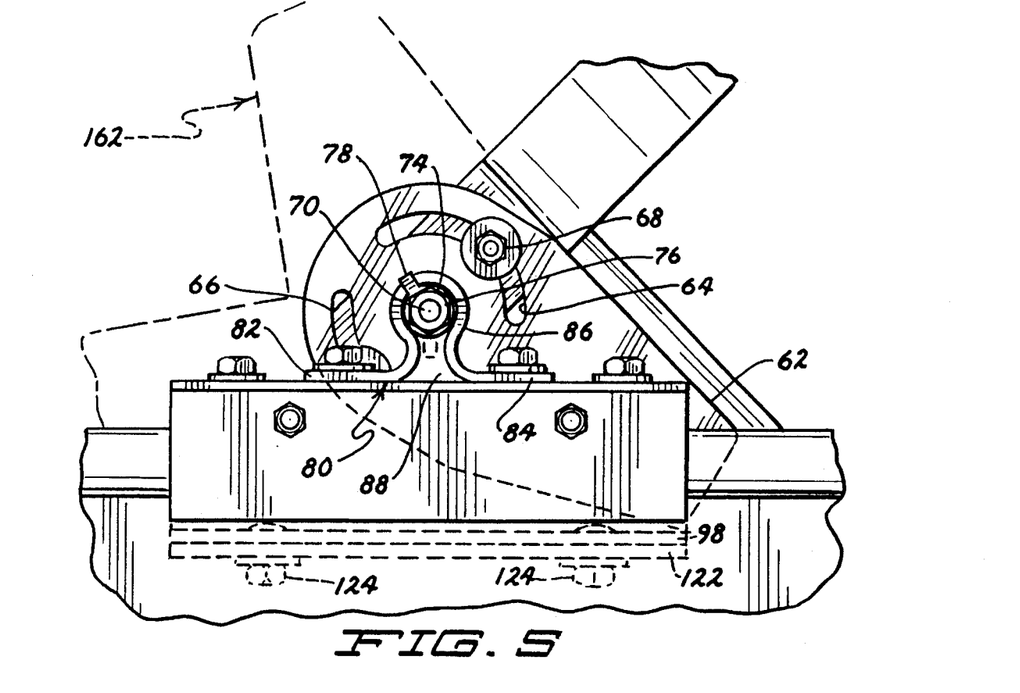
FIG. 5 illustrates a mounting apparatus for the present invention in a side elevation view.
Figure 6:
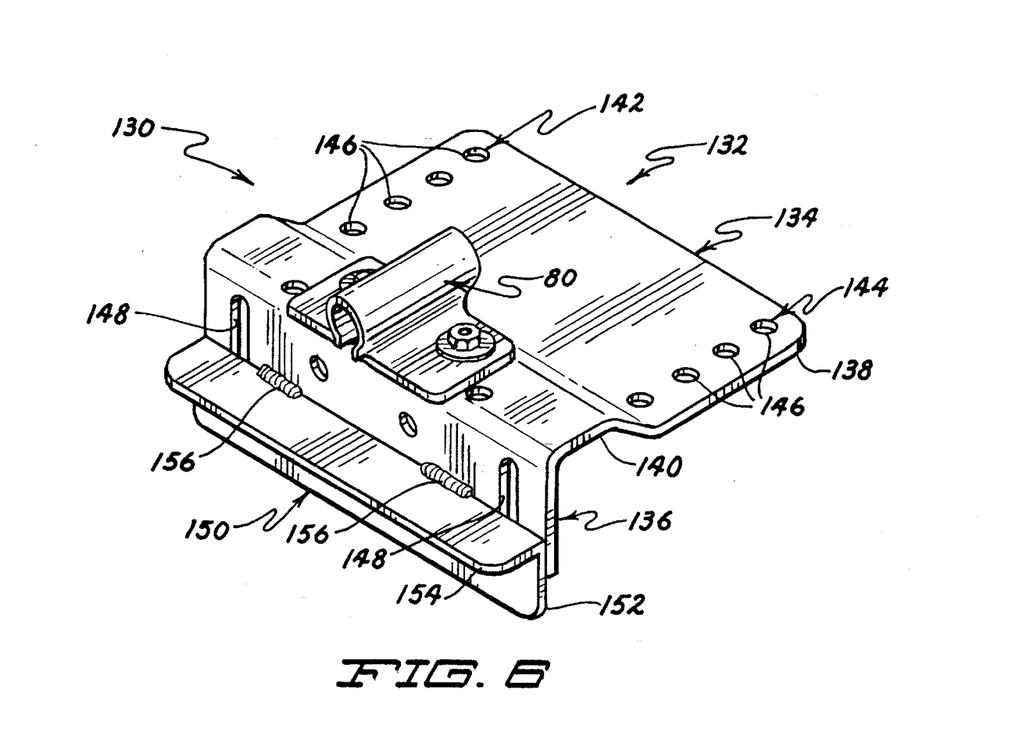
FIG. 6 shows an alternative embodiment of a mounting apparatus for the present invention in a perspective view.

Referring now to FIGS. 2–6 the mounting apparatus 14 will be described. The mounting apparatus may take the form of an adjustable embodiment capable of being attached to a variety of boat sidewalls as shown in FIGS. 1–5 or a permanent type of mounting arrangement as shown in FIG. 6. The fully adjustable mounting apparatus will be described first with principle reference being made to FIGS. 2–5.

Mounting apparatus 14 includes a slide frame bracket 60 extending outwardly from and attached to top ring 50. Bracket 60 may be an integral extension of top ring 50, as shown, or may be a separate unit attached thereto in any known manner. Bracket 60 is adjustably attached to a rotation plate 62 (best seen in FIG. 5). Rotation plate 62 as shown has a tear drop shaped configuration with a pair of opposed curvilinear slots 64 and 66. Rotation plate 62 is attached to bracket 60 by means of nut/bolt fasteners 68 extending through the curvilinear slots 64 and 66 as shown. The curvilinear attachment slots 64 and 66 allow rotation plate 62 to be rotatably disposed at a selected position relative to bracket 60. Rotation plate 62 together with apparatus to be hereafter described defines the limits of the downward pivotal movement of slide frame 12 relative to the boat sidewall 16 and thus determines the depth that the bottom ring 52 will be at during drifting or trolling of the boat.

Referring primarily to FIGS. 4 and 5, mounting apparatus 14 further includes a shaft 70 that extends from rotation plate 62. Shaft 70 may take the form of a carriage bolt that is inserted through a through hole (not shown) in rotation plate 62, as best seen in FIG. 3. Shaft 70 is then inserted into a shaft sleeve 72 and a guide washer 74, and then a threaded fastener or nut 76 is threaded onto the threaded end of the shaft 70. As best seen in FIG. 5, guide washer 74 includes a projecting tab 78. Shaft 70 is then inserted into a sleeve bracket 80. Sleeve bracket 80 includes a pair of substantially planar attachment flanges 82 and 84 extending outwardly in opposing directions from a sleeve 86. Thus, sleeve 86 comprises a receiving sleeve for the sleeved carriage bolt 70. Sleeve 86 is formed from a single piece of material and is not a complete circular structure. Sleeve bracket 80 defines a channel 88 into which guide washer tab 78 must be inserted when shaft 70 is inserted into sleeve bracket 70. The presence of the tab 78 allows the shaft 70 to be inserted into sleeve 86 of sleeve bracket 80 in only one orientation and thus tab 78 and channel 88 act as a key and keyway for the insertion of the shaft 70 into sleeve 86. Once shaft 70 has been inserted into the sleeve 86, shaft 70 and thus the attached slide frame 12 can be rotated to the operational position 90 shown in FIG. 1. When in this position the tab 78 prevents shaft 70 from sliding out of sleeve 86 since it is not oriented to pass through the channel 88. Tab 78 and the sleeve 86 are thus in an interfering relationship as best seen in FIGS. 4 and 5.

Sleeve bracket 80 forms part of a mounting mechanism 92 that is attached directly to the boat sidewall 16. In practice, mounting mechanism 92 can be removably attached to the boat and left thereon more or less permanently if so desired. The slide frame may then be removed and attached to the boat as desired. Mounting mechanism 92 will be described with principle reference being made to FIGS. 3–5. As shown in the Figure, the boat sidewall 16 is shown as having an oval cross sectional configuration. It will be understood that that particular depiction is schematic in nature and that the variety of cross sectional configurations of boat sidewalls is numerous. The mounting mechanism 92 is intended to accommodate that wide variety of boat sidewalls. Mechanism 92 includes a dual right angle bracket 94. Bracket 94 may be formed from a single piece of material shaped into the general configuration shown in the drawings, or it may be formed, as shown, from a right angle bracket 96 to which an outwardly extending flange 98 is attached by some known means such as welding. Right angle bracket 96 includes arms 100 and 102 extending substantially at right angles to each other. Arm 100 is disposed so as to lie over the top of the boat sidewall 16 while arm 102 extends downwardly along the boat sidewall 16. Attachment flanges 80 and 82 of sleeve bracket 80 are attached by means of threaded fasteners 104 or other known means to arm 100 of right angle bracket 96. Arm 100 includes a pair of elongate slots 106, 108 (shown in phantom in FIG. 3) configured to adjustably receive a pair of threaded fasteners 110, 112 respectively. As seen in the side elevation view of FIG. 4, fasteners 110 and 112 are used to attach a right angle bracket 114 to arm 100. Bracket 114 includes bracket arms 116 and 118. Arm 116 lies substantially flush with arm 100 and has a pair of through holes (not shown) therein through which fasteners 110 and 112 extend. Arm 102 of right angle bracket 96 has a pair of through holes therein through which threaded fastener 120 extend. Fasteners 120 extend on through respective through holes (not shown) in arm 118 of right angle bracket 114. Arms 102 and 118 of right angle brackets 96 and 114, respectively, sandwich or clamp boat sidewall 16 therebetween as best seen in FIG. 4. Fasteners 120 rest upon the top of sidewall 16. Sidewall 16 is drawn schematically and in phantom and is meant to be illustrative only since the wall 16 may take on varying configurations depending on the boat model. Fasteners 120 are used to tightly squeeze the boat sidewall 16 between arms 102 and 118. After the threaded fasteners 120 have been tightened to the extent required to safely retain the carriage 10 on the side of the boat, fasteners 104 and 106 will be tightened. In this manner, mounting mechanism 92 can accommodate boat sidewalls of varying widths.

As seen in the Figure, mounting mechanism 92 is shown relative to a boat sidewall 16 having rounded rather than square edges. These rounded edges allow for the possibility of the mounting mechanism 92 rotating relative to the sidewall 16 since the planar surfaces of the mounting mechanism are engaging the rounded surfaces of the boat sidewall. To prevent that rotation, which could be damaging to either the boat sidewall 16, the present invention, or both, mounting mechanism 92 has been constructed to prevent that unwanted and potentially damaging rotation. Thus, referring now to FIG. 4 in particular, it will be seen that adjustable mounting mechanism 92 further includes an adjustably positionable anti-rotation plate 122. Anti-rotation plate 122 is attached to flange 98 by means of fasteners 124. Preferably, anti-rotation plate 122 will include a pair of elongate slots (not shown) to enable the anti-rotation plate 122 to be slid into engagement with the boat sidewall 16. When so engaged., the fasteners 124 may be tightened to hold the anti-rotation plate in the aforementioned engagement and thereby prevent the carriage 10 from rotating about its attachment to the boat sidewall 16.

Referring now to FIG. 6 an alterative attachment mechanism 130 will now be described. Mechanism 130 includes a sleeve bracket 80 attached to a right angle bracket 132 to be hereafter described. Right angle bracket 132 includes first and second arms 134 and 136 extending substantially perpendicularly to each other. Arm 134 will lie over the top of boat sidewall 16 while arm 136 will lie substantially therealong. Arm 134 may be configured as shown to closely engage the top of a particularly configured boat sidewall if desired. Thus, as seen in FIG. 6, arm 134 includes a substantially planar portion 138 and a curvilinear portion 140. Planar portion 138 includes at least two rows 142, 144 of through holes 146, each row 142, 144 including a plurality of holes 146. Holes 146 are used to receive a threaded or other known type of fastener to removably mount the mounting mechanism 130 to a boat on a more or less permanent basis. Fasteners will be inserted through the holes 146 into an appropriate receiver (not shown) within the boat. Such a receiver may include any structure—such as a mounted bar having holes therein—capable of receiving and retaining the fasteners used to attach the mounting mechanism 130 to the boat sidewall 16.

Arm 136 includes a pair of elongate slots 148 that may be used along with threaded or other appropriate fasteners to adjustably mount a right angle bracket 150 thereto. Right angle bracket includes bracket arms 152 and 154 extending substantially at right angles to each other as shown in the Figure. Arm 152 will include, though not shown, a pair of through holes for receipt of appropriate fasteners (not shown) by which bracket 150 will be mounted to arm 136 of right angle bracket 132. Alternatively, right angle bracket 150 may be fixedly attached to arm 136 by means of welding, as indicated by weld beads 156.

The present invention having been described in some detail, its further features and advantages will become apparent as its operation is described hereafter. As previously mentioned, mounting mechanism 92 (or 130) can be attached to the sidewall 16 of a boat in the manner previously described and as shown in the drawings. Slide frame 12 with the attached rotation plate 62 and shaft 70, shaft sleeve 72, guide washer 74, and threaded fastener 76 is then attached to the mounting mechanism 92 (or 130). Referring to FIGS. 4 and 5 and the phantom drawings, this attachment is accomplished by rotation of the slide frame 12 such that guide washer tab 78 is aligned with channel 88 of sleeve bracket 80 (as best seen in FIGS. 4 and 5). As indicated by arrow 160 the slide frame is then moved from its engagement position 162 toward the boat sidewall 16 such that the shaft 70 is received by the sleeve 86 thereof. When the guide washer 78 exits the other side of the sleeve 86, the slide frame will be rotated to its operational position 90 as shown in FIGS. 1, 2 and 7. As seen in those Figures, carriage 10 is disposed such that the lower or bottom end and thus bottom ring 52 of slide frame 12 is under the surface 20 of the water 18. The depth at which the lower end of the slide frame 12 sits with respect to the surface is determined by the interference between rotation plate 62 with flange 98 (or the interference of rotation plate 62 with bracket arm 154 of right angle bracket 150) This interference is shown in FIGS. 2–5. Thus, by adjusting the angular position of the rotation plate 62 relative to slide frame bracket 60 by rotating the rotation plate 62 using the curvilinear slots 64 and 66 and the threaded fasteners 68, the depth at which the lower end, that is, bottom ring 52, sits can be controlled. Rotation plate 62 thus provides a means for controlling the depth of the bottom ring 52 relative to the water surface 20.

Bait container 22 is shown in FIG. 7 floating on the water's surface 20 in a position 164 where access to the bait 165 therein is not desired. As best seen in FIG. 7, bait container 22 is filled with a substantial amount of water, which may flow into and out of the container 22 through the holes 34. The bait container 22 rides deeper into the water, thus allowing the bait to reach a lower depth relative to the water surface 20 than if container 22 were simply floating on the surface. This allows the bait to reach cooler water and aids in maintaining the vitality of the bait.

When the fisherman needs bait, he will pull on rope 166 which is attached to the handle 168 of container 22 in any known manner. The container 22 will slide upwardly towards top ring 50, guided by side or slide walls 46 and 48 until the container 22 attains a bait access position 170 as shown in FIG. 8. As best seen in FIGS. 7 and 8, one of the sidewalls, here sidewall 46, includes a container rest 172, which may be a nut fastened onto the end of a screw inserted through the sidewall 46. The bottom of the container 22 may be rested on container rest 172 and the container 22 canted relative to the sidewalls 46, 48 so that it cannot slide back downward until the bottom thereof is disengaged from the container rest 172. The container 22 will therefore maintain the bait access position 170 until the fisherman disengages it from the container rest 172. Placement of the container rest on the sidewall away from the boat is desirable since the pulling force exerted on the container 22 will tend to pull the top thereof toward the boat and thus cant the bottom naturally towards the sidewall disposed away from the boat. Thus, the container will tend to naturally engage and rest upon the container rest 172.

As the fisherman pulls the bait container 22 the bait container 22 will be pulled downward under the influence of gravity and thus will slide upwardly at the lowest possible elevation relative to the slide frame sidewalls 46 and 48. As the container 22 moves upwardly past top ring 50, then, knob 44 will engage the bottom side 174 of top ring 50 in the manner shown in FIG. 8. The engagement of knob 44 and bottom side 174 will occur due to the natural tendency of the bait container to slide under the influence of gravity in the aforementioned manner and since the knob 44 is located on the downward side of the container 22. As knob 44 engages the ring 50, cord 40 will be pulled through the hole 34 through which it extends and exert a pulling force on door 30, causing it to swing open to the position shown in FIG. 8. As seen in the Figure, the water inside the container 22 has drained therefrom through the holes 34 along the back side thereof so as to confine the bait to a smaller volume of the container and thus making the bait easier for the fisherman to catch. Knob 44 will preferably be sized so as to be unable to pass ring 50 in either direction unless bait container 22 is substantially aligned with the center of the slide frame 12.

Thus, when a fisherman wishes to get bait from the container 22, he will pull on rope 168 to pull container 22 upwardly. Knob 44 will engage ring 50 by the upward movement, causing door 30 to open. Preferably cord 40 would have a length such that when door 30 was pulled entirely open, the bottom of the container 22 would be slightly above container rest 172. The fisherman could then rest the container 22 on the container rest 172, reach into the container, and catch his bait. The container could then be returned to its container floating position 166 by removing it from the container rest and allowing it to slide downwards into the water 18 guided by sidewalls 46 and 48 of slide frame 12. As the container 22 slides into the water, the tension on the cord 40 will be released and the spring biased door 30 will return to its closed position as shown in FIG. 7. The container 22 will again fill with water through holes 34. This bait accessing operation can be accomplished if desired with only one hand since the rope 166 can be operated with one hand, the opening of the door is automatic as a result of the cooperative action of the knob 44 and the bottom side 174 of top ring 50, and the container can be placed on the container rest 172 by pulling on the rope 166.

Referring now to FIG. 1, it will be seen that the present invention 10 is shown in phantom in a non-drifting or non-trolling position 176. That is, when the present invention 10 is in the position 90 the boat is adrift or slowly trolling through the water 18. As the boat picks up speed, slide frame 12 will rotate about the shaft 70/sleeve 86 connection due to the influence of the passing water on the slide frame 12 and the container 22 in the manner shown by the phantom drawing of the apparatus 10 in FIG. 1. At higher speeds, the boat will begin to plane, that is, to rise partly out of the water, thereby reducing the draft of the boat and raising the elevation of the top of the boat sidewall, and thus the attached apparatus 10, relative to the water surface 20. As this planing action occurs, the slide frame 12 will tend to rotate back to its angular position relative to the boat when drifting. Due to the planing action of the boat and the increased elevation of the top of the boat side wall, the slide frame 12 now, however, will be entirely or substantially free of any contact with the water surface 20. Thus, container 22 and slide frame 12 will be lifted out of the water by the planing action of the boat. Because boats have varying drafts, the relative angular position of the slide frame 12 relative to a particular boat sidewall can be adjusted so that the slide frame 12 will be free of the water when the boat planes. It will be recalled that this angular position is determined by the position of the rotation plate 62 and its interference with the flange 98. The rotation plate 62 therefore also serves the advantageous function of allowing the slide frame 12 to be pivoted to a proper angular position relative to the boat sidewall 16 such that the apparatus 10 can be quickly and easily adjusted to accommodate the varying drafts of the wide variety of boats. With the present invention, then, should the fisherman neglect to take the container from the water before beginning to move the boat, the container will not be subjected to the sometimes violent bouncing off the waves as happened previously.

The present invention may be formed from sheet metal or from appropriate synthetic materials if desired.

The present invention having thus been described, other modifications, alterations, or substitutions may now suggest themselves to those skilled in the art, all of which are within the spirit and scope of the present invention. For example, the sidewalls 46 and 48 could take other forms as previously mentioned and each could include a pair of elongate rods rather than the solid structure shown therein. Sidewalls formed of such spaced apart rod pairs would also function to constrain the movement of the container in directions other than along the elongate axis of the slide frame. It is therefore intended that the present invention be limited only by the scope of the attached claims below.

What is claimed is:

1. A bait container and apparatus for supporting said bait container from a side of a boat, wherein said bait container comprises:

a substantially cylindrical body having an upper portion with an access door;

and wherein said apparatus comprises:

a carriage for slidably supporting said bait container, said carriage including:

spaced apart, opposing elongate sides, each side having a top end and a bottom end; and top and bottom support members respectfully attached to said top and bottom ends of said sides, said bait container being slidably received between said sides for slidable, up and down, accessing movement therein; and means for pivotally mounting said carriage to the side of a boat comprising:

a mounting bracket constructed and arranged to be attached to the side of a boat;

a pivotal mounting member secured to said bracket to project substantially horizontally from the side of a boat, said mounting member being attached to said carriage between said top and bottom support members and extending substantially transversely to said carriage and defining a substantially horizontal axis about which said carriage may pivot, whereby said carriage with said bait container therein will pivot under the influence of gravity such that it is disposed with the bottom ends of said sides and the bait container in the water when the boat is moving at slow speeds and will pivot under the influence of the boat moving through water at higher speeds to raise the bottom ends of the carriage sides to an elevated position adjacent the water surface.

2. The apparatus of claim 1 wherein said sides each define a channel within which the bait container slides.

3. The apparatus of claim 1 wherein each said side comprises a pair of elongate, spaced apart rods.

4. The apparatus of claim 1 wherein said means for mounting comprises:

a right angle mounting bracket, said bracket including first and second arms disposed substantially at right angles to each other; and said pivotal mounting member being secured to said first arm.

5. The apparatus of claim 1 wherein said pivotal mounting means comprises:

a sleeve mounted to said bracket; and said pivotal mounting member comprises a shaft pivotally received by said sleeve, said shaft being affixed at one end to said carriage and extending through said sleeve.

6. The apparatus of claim 5 and further including means for retaining said shaft within said sleeve.

7. The apparatus of claim 6 wherein said means for retaining comprises:

a washer received by said shaft, said washer including a tab extending outwardly therefrom; and a channel, said channel being formed in said sleeve and configured and disposed to receive said tab in a particular orientation, wherein said carriage is rotated so as to align said tab and said channel when said shaft is inserted into said sleeve and when said carriage is rotated to its operational position said tab and said channel are not aligned.

8. The apparatus of claim 1 and further including:

means for limiting the pivotal movement of said carriage on said mounting bracket.

9. The apparatus of claim 8 wherein said means for limiting the pivotal movement of the carriage comprises:

a rotation plate, said rotation plate being attached to said top support member; and a flange, said flange being attached to said bracket and extending away from the side of the boat;

wherein said rotation plate is configured so as to engage said flange so as to cooperatively interfere therewith to limit the pivotal movement of said carriage.

10. The apparatus of claim 9 and further including:

means for adjustably defining the limit of the pivotal movement of said carriage.

11. The apparatus of claim 10 wherein said means for adjustably defining the limit of pivotal movement comprises:

said rotation plate including a pair of curvilinear slots and being attached to said top support member by a pair of fasteners that extend through said curvilinear slots, wherein said rotation plate may be rotated to a desired angular position relative to said top member and said fasteners tightened so as to fix said rotation plate at said desired angular position, whereby the limit of pivotal movement of said carriage may be adjusted by changing the desired angular position of said rotation plate relative to said top support member.

12. The apparatus of claim 1 and further including a positioner for resting the bait container thereon in a bait access position.

13. The apparatus of claim 12 wherein said carriage sides are disposed such that a carriage side is farther from the boat sidewall than is said other carriage side, said positioner being attached to said carriage side away from said boat side wall.

14. A bait container and apparatus for supporting said bait container from a side of a boat, wherein said bait container comprises:

a substantially cylindrical body having an upper portion having a door spring biased to a closed position; and a pair of oppositely disposed floatation lobes;

and wherein said apparatus comprises:

a carriage for slidably supporting said bait container, said carriage including:

spaced apart, opposing elongate sides, each side having a top end and a bottom end and said opposing, elongate sides being configured to closely engage said flotation lobes; and top and bottom support members respectively attached to said top and bottom ends of said sides; and means for mounting said carriage to the side of the boat;

wherein said bait container is slidably received between said sides and is slidable between said top and bottom ends of said carriage sides between a bait access position and a non-access position.

15. The bait container and apparatus of claim 14 wherein said carriage sides are disposed such that one of said sides is farther away from the boat than the other side when the carriage is attached to the boat and wherein said side farther away from the boat includes a positioner for resting the bait container thereon in said bait access position.

16. The bait container and apparatus of claim 14 and further including means for opening said door automatically comprising:

a door opening pull member attached to said door and having on one end thereof on the outside of said bait container means for engaging said top support member, whereby when said bait container is slid from said non-access position to said bait access position, said means for engaging will engage said top support member and cause said pull member to pull the door open.

17. A bait container and apparatus for supporting said bait container from a side of a boat, wherein said bait container comprises:

a substantially cylindrical body having an upper portion having a door spring biased to a closed position;

and wherein said apparatus comprises:

a carriage for slidably supporting said bait container, said carriage including:

spaced apart, opposing elongate sides, each side having a top and and a bottom end; and top and bottom support members respectively attached to said top and bottom ends of said sides;

and means for mounting said carriage to the side of the boat;

wherein said bait container is slidably received between said sides and is slidable between said top and bottom ends of said carriage sides between a bait access position and a non-access position; and means for opening said door automatically comprising:

a hole in said bait container upper portion substantially directly opposite said door;

a cord attached at one end to said door and extending through the interior of said bait container such that the other end of the cord exits through the hole opposite said door; and means for engaging said top support member attached to said other end of said cord, whereby when said bait container is slid from said non-access position to said bait access position said means for engaging will engage said top support member and cause said door to open, thereby allowing a fisherman access to the bait therein.

* * * * *